US011122425B2

(12) United States Patent
Zaman et al.

(10) Patent No.: US 11,122,425 B2
(45) Date of Patent: Sep. 14, 2021

(54) SYSTEMS AND METHODS FOR ENCRYPTING COMMUNICATION BETWEEN VEHICLES

(71) Applicant: The Regents of the University of California, Oakland, CA (US)

(72) Inventors: Imam Uz Zaman, Irvine, CA (US); Anthony Bahadir Lopez, Irvine, CA (US); Mohammad Abdullah Al Faruque, Irvine, CA (US); Ozdal Boyraz, Irvine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 244 days.

(21) Appl. No.: 16/510,097

(22) Filed: Jul. 12, 2019

(65) Prior Publication Data

US 2020/0021977 A1 Jan. 16, 2020

Related U.S. Application Data

(60) Provisional application No. 62/697,864, filed on Jul. 13, 2018.

(51) Int. Cl.
*H04W 12/041* (2021.01)
*H04W 12/03* (2021.01)
*H04L 9/08* (2006.01)
*H04L 29/06* (2006.01)
*H04W 4/46* (2018.01)
*H04B 10/116* (2013.01)

(52) U.S. Cl.
CPC .......... *H04W 12/03* (2021.01); *H04B 10/116* (2013.01); *H04L 9/0852* (2013.01); *H04L 63/0435* (2013.01); *H04W 4/46* (2018.02); *H04W 12/041* (2021.01); *H04L 2209/80* (2013.01); *H04L 2209/84* (2013.01)

(58) Field of Classification Search
CPC ..... H04W 12/03; H04W 12/041; H04W 4/46; H04L 9/0852; H04L 63/0435; H04L 2209/84; H04L 2209/80
See application file for complete search history.

(56) References Cited

U.S. PATENT DOCUMENTS

2009/0225982 A1* 9/2009 Yener ............... H04L 63/06
380/44

* cited by examiner

*Primary Examiner* — Matthew T Henning
(74) *Attorney, Agent, or Firm* — Nguyen Tarbet LLC

(57) ABSTRACT

A physical layer secret key generation scheme exploiting randomness of the road surface and driving behavior is described herein. A symmetric key generation scheme can be implemented in any existing V2V visible light communication. By analyzing and simulating numerous samples taken from NGSIM vehicle trajectory data, the natural driving behavior and road surface roughness can be exploited as a source of randomness to generate symmetric cryptographic security keys.

16 Claims, 6 Drawing Sheets

Generated
64-bit matched    0101010101110101010001010010
symmetric keys by  1010101110101100110001100001011101
Alice and Bob     00001001001001100101100001010
g=16              000010010010101001011000100110
σ=0.3

Generated
128-bit matched   0101010101110101010001010010
symmetric keys    1010101110101100110001011101
by Alice and Bob  00001001001001100101100001010
g=16              00001001001011001011000100110
σ=0.3

FIG. 6A

Generated         0101010101110101010001010010
64-bit keys by Eve 0101011101010001011000101001
                  0010101110100011000010111011
g=16              0001
σ=0.3

Generated
128-bit keys by   0101010101110101010001010101
Eve               0101110100001100101111011001
g=16              01000010110010000000010110
σ=0.3             0010011001110001110001111001

FIG. 6B

SYSTEMS AND METHODS FOR ENCRYPTING COMMUNICATION BETWEEN VEHICLES

CROSS-REFERENCES TO RELATED APPLICATIONS

This application is a non-provisional and claims benefit of U.S. patent application Ser. No. 62/697,864, filed Jul. 13, 2018, the specification(s) of which is/are incorporated herein in their entirety by reference.

FIELD OF THE INVENTION

The present invention relates to security and encryption of communication channels, in particular, to a physical layer secret key generation scheme exploiting randomness of the road surface and the driving behavior.

BACKGROUND OF THE INVENTION

Visible light communication (VLC) is a rapidly growing wireless optical communication technology in which visible light is employed as the transmission medium exploiting the advantage of omnipresent LEDs and photodiodes. Recently, VLC has been proposed as an effective alternative to radio-based (RF) wireless networks for short range communication due to its many advantages over RF such as high spectral availability, precise pointing due to high directional Line of Sight (LOS) propagation, and immunity to the multipath fading. These qualities make VLC the best choice for Vehicle to Vehicle (V2V) communications, especially where vehicles need to be driven in a controlled close formation to increase traffic fluidity and road throughput and decrease traffic jams. Data flow among vehicles is so vital in delivering vehicle information such as speed, brake, acceleration and any kind of warning for safety operation of vehicles.

Like any other communication medium, VLC is susceptible to many security threats including jamming, eavesdropping, interception and physical infrastructure attack. Hence, securing communication with a reliable cryptographic design is desirable. However, key management is the most difficult problem to resolve in cryptography. The state-of-the-art cryptographic algorithm requires pre-shared keys, which is easily accessible to attackers if they have comprehensive knowledge of the system. Hence, there exists a need for a more secure system and method that utilizes VLC for V2V communications.

SUMMARY OF THE INVENTION

In some aspects, the present invention features a novel symmetric secret key generation scheme for vehicular VLC link that utilizes a low data rate (1 Kbps to 1 Mbps) probe signal and the random intensity variation at the detector to generate symmetric keys. The random intensity variation is caused by the stochastic nature of road surface roughness and driving behavior of vehicle drivers. As will be described herein, to increase the reliability, a market weighted headlamp beam model and vehicle trajectory data by Next Generation SIMulation (NGSIM) program (by Federal Highway Administration) are incorporated into a simulation of the present invention. With moderately low error, the present invention successfully generated, secret symmetric keys with lengths up to 128-bits using a 1 kbps probe signal with the proposed scheme. It was found that the keys generated from the vehicular visible light channels have high randomness (they pass several NIST randomness tests) and that separate channels are highly uncorrelated to one another (e.g., Pearson correlation coefficient of 0.32).

In some aspects, the present invention features a method of generating a set of at least two identical encryption keys for encrypting data across a communication channel shared by at least two vehicles. The encryption keys are generated independently by each vehicle using a stochastic process of the communications channel shared by the vehicles. In some embodiments, the stochastic process, which is caused by road conditions and driving behavior, is observable to all of the vehicles.

In one embodiment, the method may comprise coordinating a common time for the at least two vehicles to begin sampling the stochastic process, and for all of the vehicles, sampling a plurality of sample points of the stochastic process, wherein a number of sample points is identical for all of the vehicles, wherein each sample point has a corresponding index, and quantizing the sample point using a quantization rule for each sample point in the plurality of samples thus sampled to produce a quantized point that is a key bit of the encryption key. The quantization rule is the same for all entities and determines if the key bit is a "1", a "0", or invalid. If the sample point is a "1" or a "0", the sample point is a valid sample point. The indices corresponding to valid sample points comprise a plurality of valid indices, and the key bits of all of the valid sample points together comprise a plurality of key bits. The method further comprises for each vehicle: sharing the plurality of valid indices with all other vehicles, comparing the pluralities of valid indices of the other vehicles, selecting only the valid indices shared by all vehicles, and determining a plurality of shared valid indices that are common to all of the vehicles, and selecting the plurality of key bits corresponding to the shared valid index values that are common to all of vehicles. The plurality of key bits selected comprises the encryption key.

One of the unique and inventive technical features of the present invention is the pluralities of key bits comprising the encryption keys are generated using a stochastic process that is symmetric and observable to all of the vehicles. Without wishing to limit the invention to any theory or mechanism, because the stochastic process is common to all vehicles, the encryption keys that are generated independently by each vehicle are identical. None of the presently known prior references or work has the unique inventive technical feature of the present invention.

According to other aspects, the present invention features a system for sending encrypted messages between two vehicles. Without wishing to be bound by theory, the two vehicles are symmetrically affected by a stochastic process. The stochastic process is observable to all the vehicles and caused by road conditions and driving behavior.

In some embodiments, the system may comprise the first vehicle capable of transmitting a signal, a first transceiver disposed on the first vehicle, a first sensor disposed on the first vehicle and capable of sensing a signal transmitted by the second vehicle, a first processor operatively connected to the first transceiver and the first sensor, the second vehicle capable of transmitting a signal, a second transceiver disposed on the second vehicle, the second sensor disposed on the second vehicle and capable of sensing the signal transmitted by the first vehicle, and the second processor operatively connected to the second transceiver and the second sensor. The first processor and second processor are configured to execute computer readable instructions. The computer readable instructions may be stored in a non-transitory computer readable storage medium such as a memory device. Each processor can be coupled to a memory device and both disposed in the vehicle.

In some embodiments, execution of the instructions causes each processor to independently perform operations comprising sending and receiving the signals with the processor of the other vehicle, sampling a fixed number of sample points from the received signal at fixed intervals thereby producing a plurality of sample points that each have an index, and quantizing each sample point. Preferably, the same number of sample points is sampled by the processors of both vehicles. Without wishing to limit the invention to a particular theory or mechanism, the plurality of sample points is unique to the received signal due to the stochastic nature of the road conditions and driving behavior. Each quantized sample point is either a "1", a "0", or invalid and the quantized sample points that are "1" or "0" are valid. The index values of the valid sample points are valid index values, and the valid quantized sample points comprise a plurality of key bits corresponding to the plurality of valid index values.

In other embodiments, the operations may further comprise transmitting the plurality of valid index values to the other vehicle, receiving a plurality of valid index values from the other vehicle, comparing the two pluralities of valid index values to determine a plurality of shared valid index values, selecting the plurality of key bits corresponding to the plurality of shared valid index values, thereby producing an encryption key comprising the plurality of key bits, encrypting a message using the encryption key, transmitting the encrypted message to the other vehicle, receiving an encrypted message from the other vehicle, and decrypting the encrypted message using the encryption key. Without wishing to be bound to a particular theory or mechanism, the signals sent between the vehicles are symmetrically affected by road conditions and driving behavior in a manner observable to the vehicles. Thus, the received signals can be used to generate symmetric encryption keys. Furthermore, since the instructions for quantizing the sample points are the same for both vehicles, the encryption keys generated are identical. As a result, the first transceiver is able to correctly decrypt the message from the second transceiver, and the second transceiver is able to correctly decrypt the message from the first transceiver.

In one embodiment, the signals are visible light signals. The stochastic process may be a fluctuation in signal strength of the visible light signals caused by road conditions and driving behavior. The visible light signals may be generated by headlights or taillights of the vehicles. For example, a first vehicle may detect taillights of a second vehicle in front of the first vehicle, and the second vehicle may detect the headlights of the first vehicle. In some embodiments, the first and second sensors are photodetectors capable of detecting the visible light signals. In another embodiment, the signals are radio frequency (RF) signals. The stochastic process may be a fluctuation of RF signal strength caused by road conditions and driving behavior.

In some embodiments, each sample point in the plurality of sample points is quantized by setting the sample point to 1 if the sample value is greater than an upper threshold, or setting the sample point to 0 if the sample is below a lower threshold. The sample point is invalid otherwise. The threshold values can vary depending on the sample index corresponding to the sample point.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

The features and advantages of the present invention will become apparent from a consideration of the following detailed description presented in connection with the accompanying drawings in which:

FIGS. 6A-6B shows example encryption keys generated by the target vehicle and a hypothetical eavesdropper.

DESCRIPTION OF PREFERRED EMBODIMENTS

Figure 1:
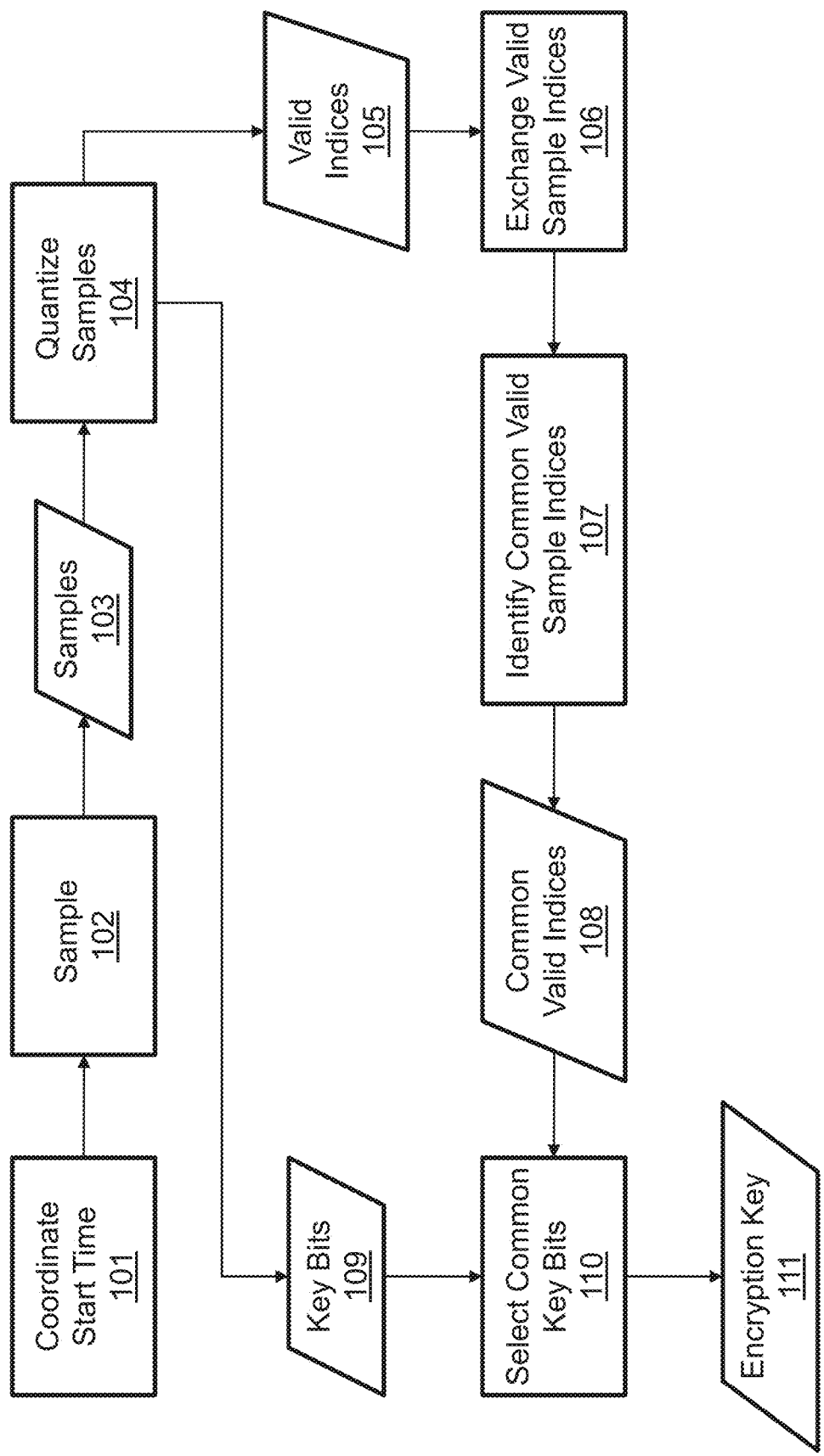
FIG. 1 shows a process flow diagram according to one embodiment of the present invention.

Following is a list of elements corresponding to a particular element referred to herein:
201 first vehicle
202 first transceiver
203 first sensor
204 first processor
205 second vehicle
206 second transceiver
207 second sensor
208 second processor
209 messages
210 first light signal
211 second light signal
212 first plurality of sample points
213 second plurality of sample points
214 plurality of valid index values
215 first encryption key
216 second encryption key Referring now to FIG. 1, in some embodiments, the present invention features a method of generating a set of at least two symmetric encryption keys for encrypting data across a communication channel shared by at least two entities. The encryption keys are generated independently by the entities and from a stochastic process of the communications channel shared by the entities. In preferred embodiments, the stochastic process is observable to all of the entities.

In one embodiment, the method may comprise coordinating a common time for the entities to begin sampling the stochastic process (101), and for all of the entities, simultaneously sampling a plurality of sample points of the stochastic process (102). The number of sample points is identical for all of the entities. Each sample point has a corresponding index for each entity of each sample in the plurality of samples (103) thus sampled. The method further comprises quantizing the sample point using a quantization rule (104) that is the same for all entities. The quantized point is a key bit of the encryption key and the quantization rule determines if the key bit is a one "1", a "0", or invalid. If the sample point is a "1" or a "0", it is a valid sample point. The indices corresponding to the valid sample points comprise a plurality of valid indices (105). The key bits of all of the valid sample points together comprise a plurality of key bits (109).

For each entity, the plurality of valid indices are shared with all other entities in the at least two entities (106). For each entity, the pluralities of valid indices are compared for all of the other entities, and only the valid indices shared by all entities (107) are selected. A plurality of shared valid indices (108) that are common to all of the at least two entities are determined, and for each entity, the plurality of key bits corresponding to the shared valid index values (110) are selected. Thus, the plurality of key bits selected comprises the encryption key (111). Without wishing to limit the present invention, because the stochastic process is observable to all of the entities, and the process used to generate the plurality of key bits is common to all entities, the encryption keys thus generated are identical.

In some embodiments, the entities are vehicles. The communications channel may be a vehicle to vehicle visible light communication channel, through which a visible light signal is transmitted between the two vehicles. The signal can be affected by road conditions and driving behavior in a manner observable to at least two vehicles. The stochastic process is the fluctuation in signal strength of the signal transmitted between the vehicles. In some embodiments, the signal is an RF signal. The random process is the fluctuation of signal strength caused by road conditions and driving behavior. In other embodiments, the signal is visible light of headlights from one vehicle to the other. The random process is the fluctuation of headlight light brightness due to the road condition and driving behavior.

In some embodiments, the quantization rule comprises an upper and a lower threshold, wherein the key bit is a 1 if the sample value is greater than the upper threshold, wherein the key bit is a 0 if the sample is below the lower threshold, wherein the sample is invalid otherwise. In other embodiments, the threshold values vary depending on the index corresponding to the sample point.

Figure 2:
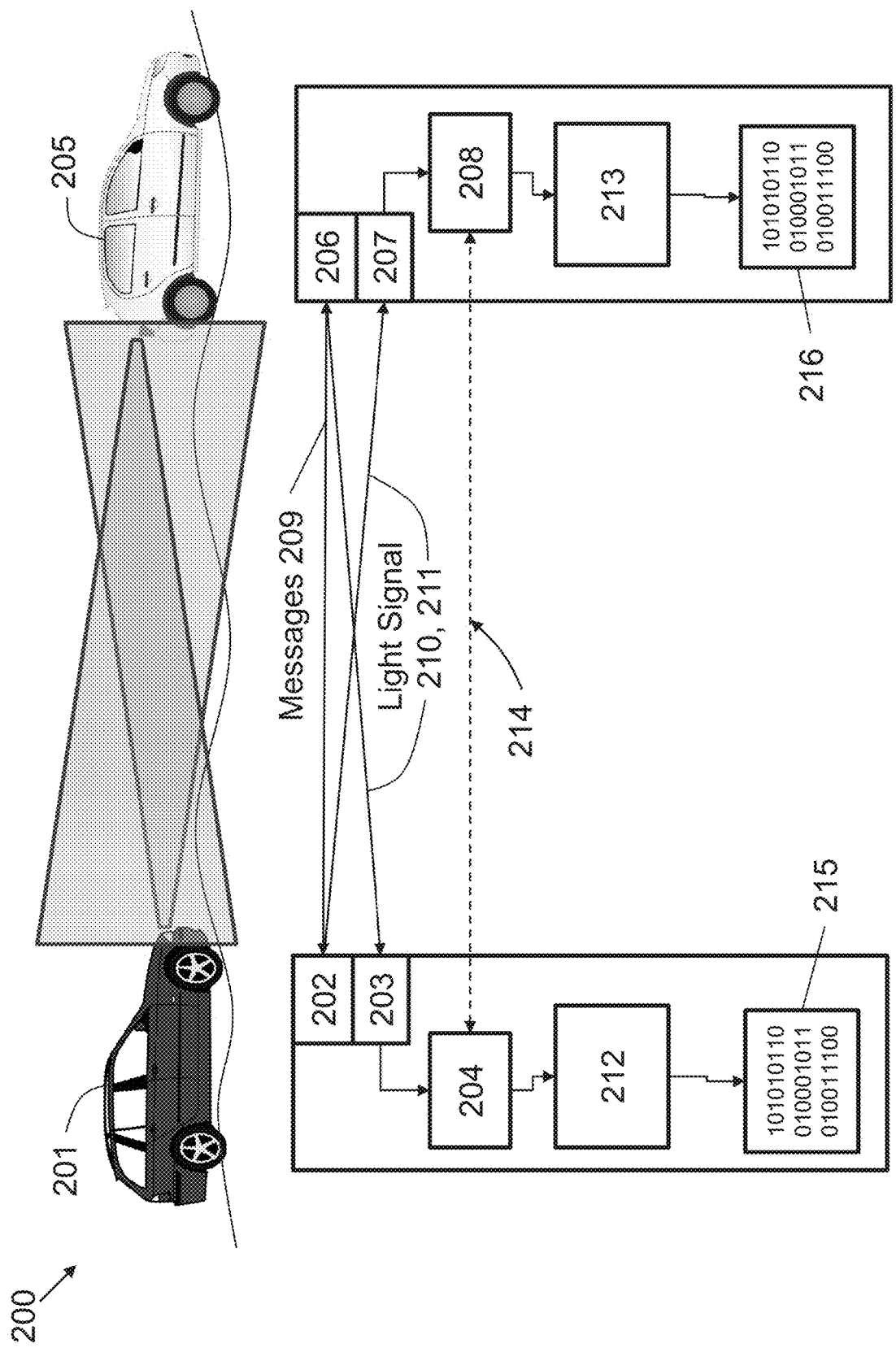
FIG. 2 shows a schematic of a system according to one embodiment of the present invention.

Referring to FIG. 2, in some embodiments, the present invention features a system (200) for sending encrypted messages between two vehicles. The two vehicles can be symmetrically affected by the stochastic nature of road conditions and driving behavior. A pre-defined probe signal, which is symmetrically affected by road conditions and driving behavior, is sent between the two vehicles, and the received probe signals are used to generate symmetric encryption keys. In some embodiments, the system may comprise the first vehicle (201) capable of transmitting a first light signal (211); a first transceiver (202) disposed on the first vehicle; a first sensor (203) disposed on the first vehicle, capable of sensing a second light signal transmitted by the second vehicle (210); and a first processor (204), operatively connected to the first transceiver and the first sensor, capable of executing computer readable instructions. In some embodiments, the computer readable instructions may comprise: instructions for sending messages (209) to the second vehicle via the first transceiver, and for receiving messages from the second vehicle via the first transceiver; instructions for receiving a sample time to begin sampling from a message from the second vehicle; instructions for sampling a fixed number of sample points from the sensor at fixed intervals beginning at the sample time, producing a first plurality of sample points wherein each sample point has an index; instructions for quantizing the first plurality of sample points, wherein the quantized sample point is a "1" or a "0", or invalid, wherein the quantized sample points that are "1" or "0" are valid, wherein the index values of the valid sample points comprise a first plurality of valid index values, wherein the valid quantized sample points comprise a first plurality of key bits (212) corresponding to the first plurality of valid index values; instructions for transmitting the first plurality of valid index values to the second vehicle (214); instructions for receiving a second plurality of valid index values from the second vehicle (214); instructions for comparing the first plurality of valid index values to the second plurality of valid index values, and for determining a plurality of shared valid index values; instructions for selecting the plurality of key bits corresponding to the plurality of shared valid index values, wherein the plurality of key bits thus selected comprises a first encryption key (215); instructions for encrypting a message using the first encryption key; instructions for transmitting the encrypted message to the second vehicle; instructions for receiving an encrypted message from the second vehicle; and instructions for decrypting the encrypted message using the first encryption key.

In other embodiments, the system (200) may further comprise: the second vehicle (205) capable of transmitting the second visible light signal (211); a second transceiver (206) disposed on the second vehicle; the second sensor (207) disposed on the second vehicle, capable of sensing the visible light signal of the first vehicle (210); and the second processor (208), operatively connected to the second transceiver and the second sensor, capable of executing computer readable instructions. In some embodiments, the computer readable instructions may comprise: instructions for sending messages (209) to the first vehicle via the transceiver, and receiving messages from the second vehicle via the transceiver; instructions for sending a sample time to begin sampling to the first vehicle; instructions for sampling a fixed number of sample points from the sensor at fixed intervals beginning at the sample time, producing a second plurality of sample points wherein each sample point has an index; instructions for quantizing the second plurality of sample points (213), wherein the quantized sample point is a "1" or a "0", or invalid, wherein the quantized sample points that are "1" or "0" are valid, wherein the index values of the valid sample points comprise a second plurality of valid index values, wherein the valid quantized sample points comprise a second plurality of key bits corresponding to the second plurality of valid index values; instructions for transmitting the second plurality of valid index values to the first vehicle (214); instructions for receiving a first plurality of valid index values from the first vehicle; instructions for comparing the first plurality of valid index values to the second plurality of valid index values, and for producing a plurality of shared valid index values; instructions for selecting the plurality of key bits corresponding to the shared valid index values, wherein the plurality of key bits thus selected is a second encryption key (216); instructions for encrypting a message using the second encryption key; instructions for transmitting the encrypted message to the first vehicle; instructions for receiving an encrypted message from the first vehicle; and instructions for decrypting the encrypted message using the second encryption key.

In some embodiments, the instructions for quantizing the sample points are the same for both vehicles. The same number of sample points can be sampled by both vehicles. Consequently, the encryption keys generated are identical, and as a result, the first vehicle is able to correctly decrypt the message from the second vehicle, and the second vehicle is able to correctly decrypt the message from the first vehicle.

In some embodiments, the quantization rule comprises an upper and a lower threshold. In one embodiment, the key bit is a 1 if the sample value is greater than the upper threshold. In another embodiment, the key bit is a 0 if the sample is below the lower threshold. In a further embodiment, the sample is invalid otherwise. In some embodiments, the threshold values vary depending on the sample index corresponding to the sample point.

Example

The following is a non-limiting example of the present invention. It is to be understood that said example is not intended to limit the present invention in any way. Equivalents or substitutes are within the scope of the present invention.

The proposed physical layer secret key generation method utilizes the randomness in the received signal due to road conditions and driving behavior. A model was developed based on the stochastic vehicle trajectory data provided by NGSIM program and the road surface roughness, and the headlight modeling. Since the Lambertian model is not an accurate model to simulate the intensity pattern of a vehicle's headlight and taillight, a market weighted headlamp beam model was utilized. Using the luminous intensity (candela) table provided in this model, the corresponding illuminance value can be calculated at any point of interest. Line of Sight (LOS) communication was used to generate symmetric secret keys. The illuminance (L) at the photodetector (PD) at the vertical angle (θ) and horizontal angle (φ)) with respect to headlamp axis is determined by the following equation:

$$L = I(\phi, \theta) \times (d\omega/dA) = I(\phi, \theta) \times (\cos \tau / r^2)$$

$$L = I(\phi, \theta) \times (d\omega/dA) = I(\phi, \theta) \times (\cos \tau / r^2)$$

where r, dA, dω, τ, I(φ,θ) are communication distance, photodetector (PD) area, solid angle, the angle between the photodetector normal and the incident direction, and luminous intensity, respectively.

Then, the received Line of Sight (LOS) optical power (PRX-LOS) is calculated by $P_{RX-LOS}=(L \times A_R)/LER$ when $0 \leq \tau \leq \Omega$ otherwise $P_{RX-LOS}=0$ where $A_R$, $\Omega$, and LER are the PD's total area, the half angle of PD's field of view (FOV) and the luminous efficacy of radiation, respectively. From the equation mentioned, the received optical power was effectively calculated and hence photodetector current. Moreover, it was assumed that the taillight follows the same model as the headlight but with much lower intensity. Shot noise was mainly considered due to background solar radiation and other artificial lights, and thermal noise associated with the receiver was also added. Relative velocity and hence relative lateral and longitudinal distances among vehicles result in random variation in the intensity pattern. This randomness can readily be exploited to generate symmetric cryptographic keys.

Figure 3:
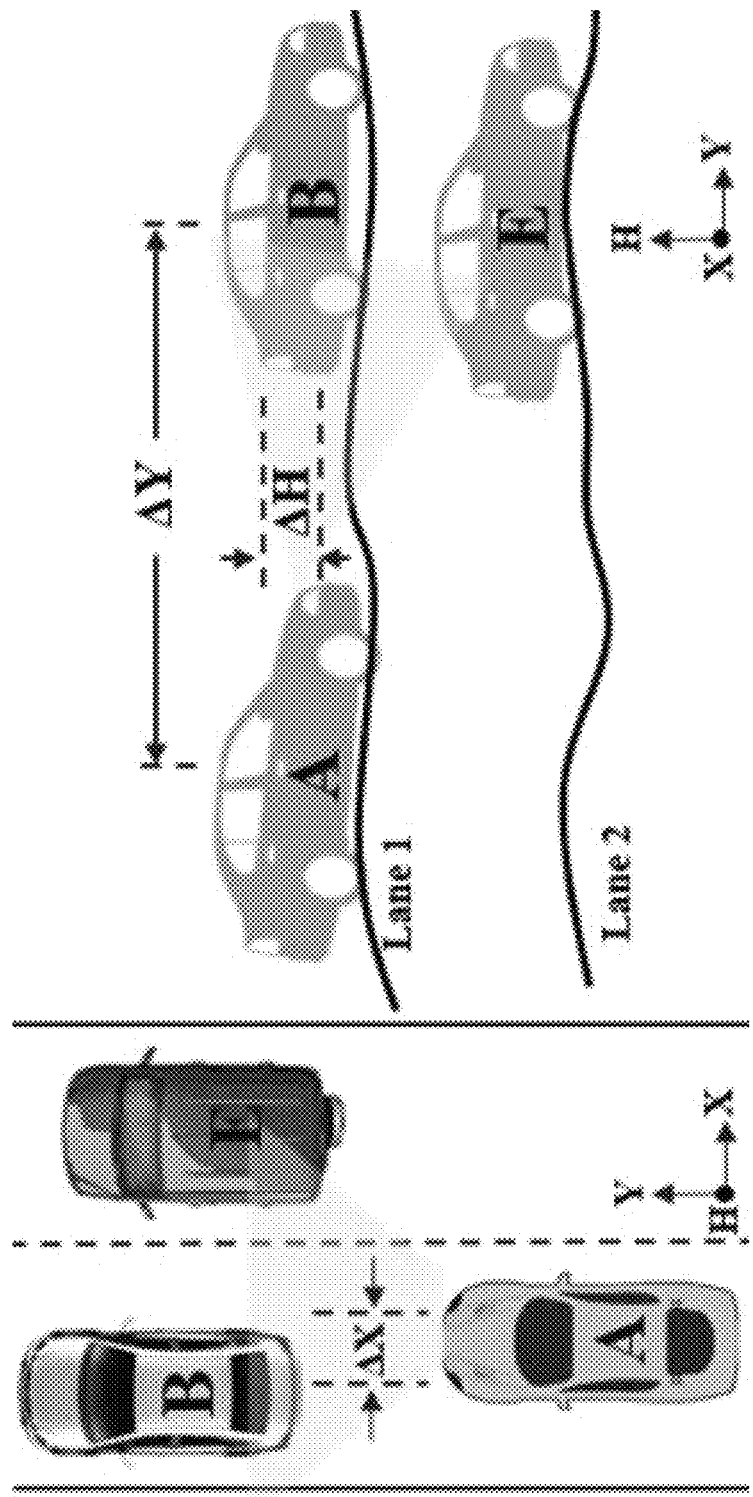
FIG. 3 shows a vehicle key generation model of the present invention. Vehicles travelling on a road communicate vehicle to vehicle. Variations in the road surface create variations in the signal strength which can be used to encrypt the data.
Figures 4A, 4B:
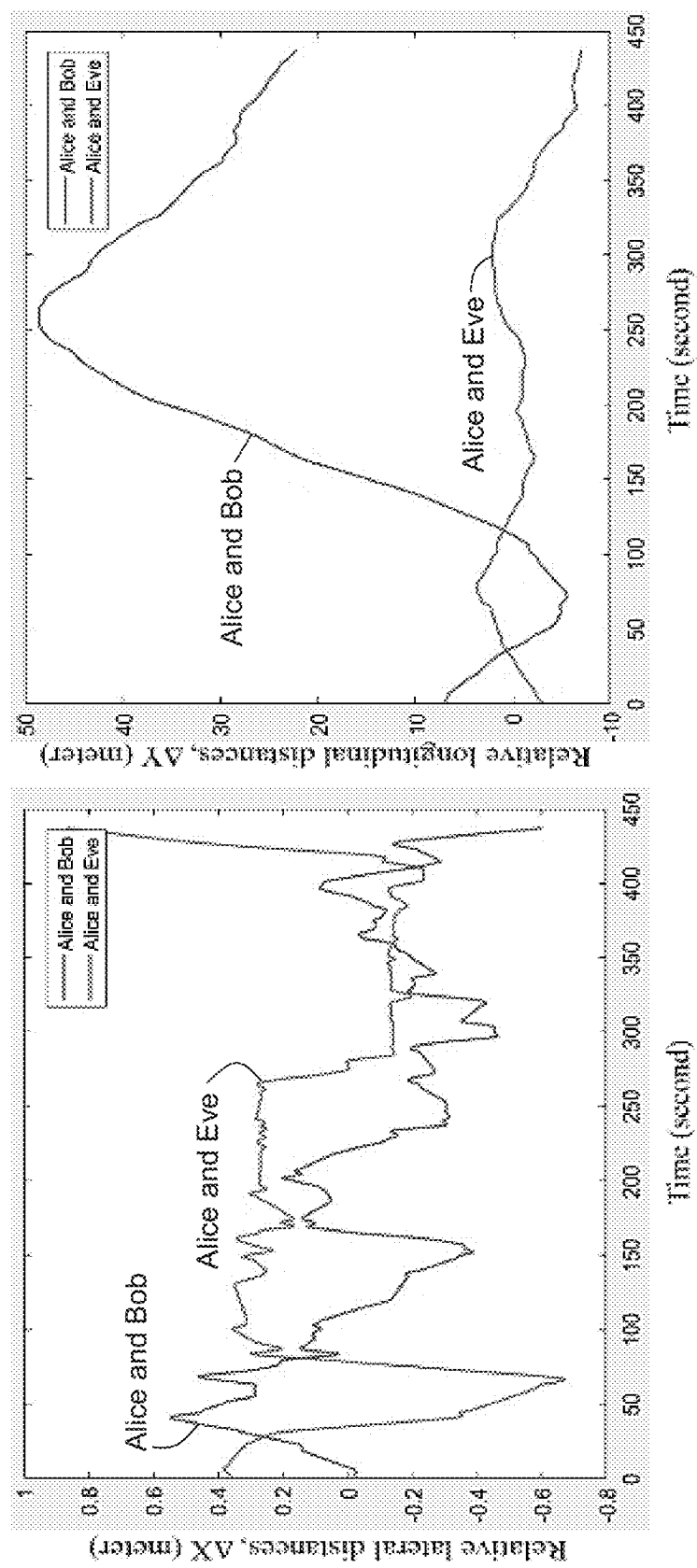
FIGS. 4A-4B show example plots of the relative distances between cars using the system of the present invention, and a hypothetical eavesdropper.

To generate symmetric keys and to assess the feasibility of the key generation scheme, the present invention developed a model of communication links between the vehicular transceivers Alice (A) and Bob (B) and another communication link between Alice (A) and the adversary Eve (E), as shown in FIG. 3. When Alice and Bob want to generate a symmetric key, they need to exchange a pre-defined probe signal (PRBS modulated bit pattern with a predefined length). To increase the reliability of the proposed method, the data of the vehicles such as speed, lateral coordinate (X), longitudinal coordinate (Y), time, etc. are extracted from the vast amount of data provided by the NGSIM program. Moreover, using big data analysis, a combination of three vehicles (Alice, Bob and Eve) were chosen, where all three are omnipresent in the vicinity of each other in the real world with the intended point-to-point link establishment between Alice and Bob. This satisfies the communication link model (FIG. 3). Then from the NGSIM data, the relative lateral (ΔX) and longitudinal (ΔY) distances between selected transceivers over a time duration were calculated. These relative distances are totally stochastic, as shown in FIGS. 4A-4B. The stochastic road surface roughness (ΔH) was also added in the mathematical model. From all this information, a received intensity distribution was found at the photodetector and the NGSIM data was interpolated to generate keys.

In the present simulation, it was found that there is a high reciprocity of the modulated probe signal (>0.9 Pearson correlation coefficient between Alice and Bob's signal). Conventionally, the adversary Eve (E) does not have direct access to the transceiver systems but might have access to the communication link. Furthermore, even if Eve has all the information regarding the communication system or features, Eve will not be able to generate same keys as Alice and Bob due to the stochastic nature of vehicle trajectory and road surface roughness. In the present key generation technique, each transceiver will take a set of samples from the pre-defined probe signal (PRBS) and quantize their signal strengths (in Amps) into symmetric key bits. Each transceiver will compute upper ($Thr_{upper}$) and lower ($Thr_{lower}$) thresholds of a group of samples, SampleGroup, with group size (g), by the following algorithm:

$Thr_{upper}$=<SampleGroup>+α×σ(SampleGroup);

$Thr_{lower}$=<SampleGroup>−α×σ(SampleGroup)

if SampleStrength≥$Thr_{upper}$ then Key Bit=1;

else if SampleStrength<$Thr_{lower}$ then Key Bit=0 else do not quantize where <x> and σ(x) represent mean and standard deviation of x respectively. Both g and α parameters can be derived or altered according to the variance of the system (the higher the variance, the higher α, and g should be).

Simulation Results and Model Verification

Figure 5A:
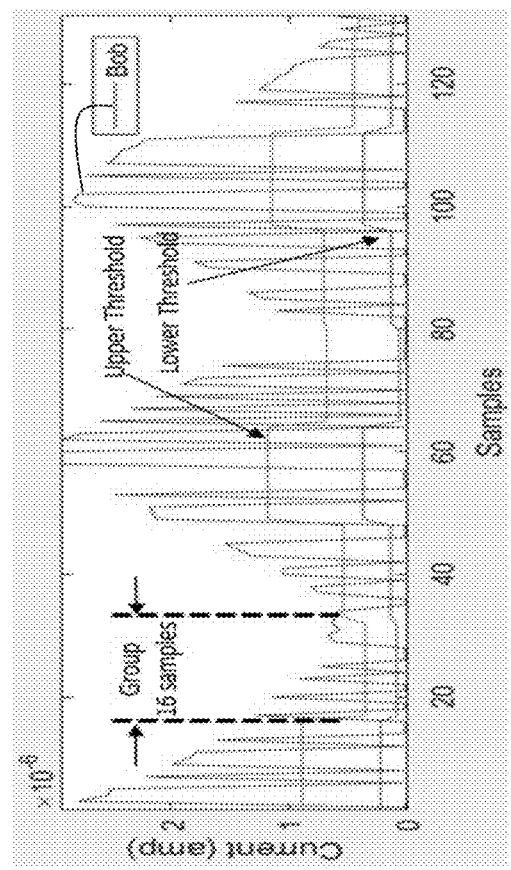
FIGS. 5A-5B show example plots of the quantization of the sample collected by a target vehicle using the system of the present invention and a hypothetical eavesdropper.
Figure 5B:
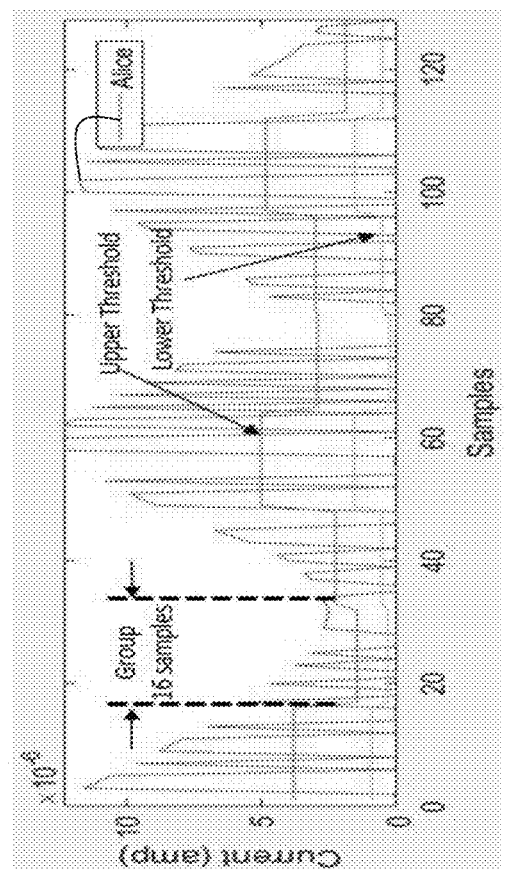

Signal propagation between the vehicles, the reciprocity checks, entropy calculation, noise calculations and the key generation algorithm are modeled in Matlab. US 101 (Hollywood Freeway) data from NGSIM was utilized to extract vehicle position-related information and included it in the mathematical model. For the key generation phase, a simulation was performed by using a 1 Kbps probe signal. FIGS. 5A-5B show the samples of the randomly modulated electrical signal received by Alice and Bob and corresponding thresholds to generate keys, respectively. To minimize the simulation time, a 2^7−1 Pseudo Random Bit Sequence (PRBS) was used as the probe signal and 512 bits to emulate data propagation. When the key generation is done, the vehicles can communicate just as in a conventional VLC link. Generated keys of different lengths with parameters of group size, g=16 and threshold constant, α=0.3 are shown in FIGS. 6A-6B. For the aforementioned settings, 34 keys were generated and it was found that 16 of them were mismatching. However, in total, there were only 60 key bits that were mismatching out of 4352 key bits. For a g=16 and α=0.8, the mismatch rate drops to only 1 mismatching key out of 20. The key mismatch rate of the algorithm therefore varies according to the parameters, g and α.

For the Alice-Eve channel, with the similar PRBS (assuming Eve has all the information about the algorithm) keys were generated for the adversary Eve as shown in FIG. 6B. All 34 keys that Eve produced from the Alice-Eve channel did not match with the keys produced by the Alice-Bob channel. The computed correlations of the received signals from the channels were: CorrAlice-Bob=0.77, CorrAlice-Eve=0.78 and CorrAlice-Bob to Alice-Eve=0.32. The first two values demonstrate the reciprocity property of the channel model while the last value demonstrates that the two channels Alice-Bob and Alice-Eve are uncorrelated to each other. To evaluate the randomness of the resulting keys, several NIST randomness tests were ran. Different key generation settings led to different levels of randomness. An example of the p-values of 34 keys generated have the same settings as shown in FIG. 6A. The tests and p-values are: approximate entropy (0.148), frequency (0.044), block frequency (0.044), cumulative sums (fwd=0.213, bkwd=0.009), runs (0.804), FFT (0.491), and serial (0.499, 0.425). For a sequence of bits to be considered truly random, these p-values must be greater than 0.01. It was found that 31 out of the 34 keys passed every single test.

As used herein, the term "about" refers to plus or minus 10% of the referenced number. Various modifications of the invention, in addition to those described herein, will be apparent to those skilled in the art from the foregoing description. Such modifications are also intended to fall within the scope of the appended claims.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A method of generating a set of at least two identical encryption keys, for encrypting data across a communications channel shared by at least two vehicles, wherein the encryption keys are generated independently by each vehicle, wherein the encryption keys are generated from a stochastic process of the communications channel shared by the vehicles, wherein the stochastic process is observable to all of the vehicles and caused by road conditions and driving behavior, said method comprising:
   a. coordinating a common time for the vehicles to begin sampling the stochastic process (101);
   b. for all of the vehicles, simultaneously sampling a plural number of sample points of the stochastic process (102), wherein the number of sample points is identical for all of the vehicles, wherein each sample point has a corresponding index;
   c. for each vehicle, for each sample in the plurality of samples (103) thus sampled, quantizing the sample point using a quantization rule (104), wherein the quantization rule is the same for all vehicles, wherein the quantized point is a key bit of the encryption key, wherein the quantization rule determines if the key bit is a one "1", a "0", or invalid, wherein if the sample point is a "1" or a "0", it is a valid sample point, wherein the indices corresponding to the valid sample points comprise a plurality of valid indices (105), wherein the key bits of all of the valid sample points together comprise a plurality of key bits (109);
   d. for each vehicle, sharing the plurality of valid indices with all other vehicles;
   e. for each vehicle, comparing the pluralities of valid indices for all of the other vehicles, selecting only the valid indices shared by all vehicles (107), and determining a plurality of shared valid indices (108) that are common to all of the at least two vehicles, and
   f. for each vehicle, selecting the plurality of key bits corresponding to the shared valid index values (110), wherein the plurality of key bits thus selected comprises the encryption key (111),
   wherein because the stochastic process is observable to all of the vehicles, and the process used to generate the plurality of key bits is common to all vehicles, the encryption keys thus generated are identical.

2. The method of claim 1, wherein the communications channel is a vehicle to vehicle visible light communication channel, wherein a pre-defined visible light signal is simultaneously transmitted between the at least two vehicles, wherein the signal is symmetrically affected by road conditions and driving behavior in a manner observable to the vehicles, wherein the stochastic process comprises fluctuations in a signal strength of the visible light signal transmitted between the vehicles.

3. The method of claim 1, wherein the signal is an RF signal, wherein the stochastic process comprises fluctuations of RF signal strength caused by road conditions and driving behavior.

4. The method of claim 1, wherein the signal is visible light of headlights from one vehicle to the other, wherein the stochastic process comprises fluctuations of headlight light brightness due to the road conditions and driving behavior.

5. The method of claim 1, wherein the quantization rule comprises an upper and a lower threshold, wherein the key bit is a 1 if the sample value is greater than the upper threshold, wherein the key bit is a 0 if the sample is below the lower threshold, wherein the sample is invalid otherwise.

6. The method of claim 5, wherein the threshold values vary depending on the index corresponding to the sample point.

7. A system (200) for sending encrypted messages between a first vehicle and a second vehicle, wherein the first vehicle and the second vehicle are symmetrically affected by a stochastic nature of road conditions and driving behavior, wherein a pre-defined probe signal is sent between the first vehicle and the second vehicle which is symmetrically affected by road conditions and driving behavior, wherein received probe signals are used to generate symmetric encryption keys, the system comprising:

a. the first vehicle (201), capable of transmitting a first light signal (210);
b. a first transceiver (202) disposed on the first vehicle (201);
c. a first sensor (203) disposed on the first vehicle (201), capable of sensing a second light signal (211) transmitted by the second vehicle (205);
d. a first processor (204), operatively connected to the first transceiver (202) and the first sensor (203), executing computer readable instructions comprising:
  i. instructions for sending messages (209) to the second vehicle via the first transceiver, and for receiving messages from the second vehicle via the first transceiver;
  ii. instructions for sending a pre-defined probe signal to the second vehicle;
  iii. instructions for receiving the pre-defined probe signal from the second vehicle;
  iv. instructions for sampling a fixed number of sample points from the pre-defined probe signal at fixed intervals, producing a first plurality of sample points (212), wherein each sample point has an index value;
  v. instructions for quantizing the first plurality of sample points, wherein the quantized sample point is a "1" or a "0", or invalid, wherein the quantized sample points that are "1" or "0" are valid, wherein the index values of the valid sample points comprise a first plurality of valid index values, wherein the valid quantized sample points comprise a first plurality of key bits corresponding to the first plurality of valid index values,
  vi. instructions for transmitting the first plurality of valid index values to the second vehicle (214),
  vii. instructions for receiving a second plurality of valid index values from the second vehicle (214),
  viii. instructions for comparing the first plurality of valid index values to the second plurality of valid index values, and for determining a plurality of shared valid index values;
  ix. instructions for selecting the plurality of key bits corresponding to the plurality of shared valid index values, wherein the plurality of key bits thus selected comprises a first encryption key (215);
  x. instructions for encrypting a first message using the first encryption key;
  xi. instructions for transmitting the encrypted first message to the second vehicle;
  xii. instructions for receiving an encrypted second message from the second vehicle; and
  xiii. instructions for decrypting the encrypted second message using the first encryption key;
e. the second vehicle (205), capable of transmitting the second light signal (211);
f. a second transceiver (206), disposed on the second vehicle;
g. a second sensor (207), disposed on the second vehicle, capable of sensing the first light signal (210) of the first vehicle;
h. the second processor (208), operatively connected to the second transceiver and the second sensor, capable of executing computer readable instructions comprising:
  i. instructions for sending messages (209) to the first vehicle via the transceiver, and receiving messages from the second vehicle via the transceiver;
  ii. instructions for sending the pre-defined probe signal to the first vehicle;
  iii. instructions for receiving the pre-defined probe signal from the first vehicle;
  iv. instructions for sampling a fixed number of sample points from the received probe signal at fixed intervals, producing a second plurality of sample points (213), wherein each sample point has an index value;
  v. instructions for quantizing the second plurality of sample points, wherein the quantized sample point is a "1" or a "0", or invalid, wherein the quantized sample points that are "1" or "0" are valid, wherein the index values of the valid sample points comprise a second plurality of valid index values, wherein the valid quantized sample points comprise a second plurality of key bits corresponding to the second plurality of valid index values,
  vi. instructions for transmitting the second plurality of valid index values to the first vehicle (214),
  vii. instructions for receiving a first plurality of valid index values from the first vehicle,
  viii. instructions for comparing the first plurality of valid index values to the second plurality of valid index values, and for producing a plurality of shared valid index values;
  ix. instructions for selecting the plurality of key bits corresponding to the shared valid index values, wherein the plurality of key bits thus selected is a second encryption key (216);
  x. instructions for encrypting a second message using the second encryption key;
  xi. instructions for transmitting the encrypted second message to the first vehicle
  xii. instructions for receiving the encrypted first message from the first vehicle
  xiii. instructions for decrypting the encrypted first message using the second encryption key;
wherein the instructions for quantizing the sample points are the same for both vehicles, wherein the same number of sample points is sampled by both vehicles, wherein consequently the encryption keys generated are identical, wherein as a result the first vehicle is able to correctly decrypt the encrypted second message from the second vehicle, and the second vehicle is able to correctly decrypt the encrypted first message from the first vehicle.

8. The system (200) of claim 7, wherein the quantization rule comprises an upper and a lower threshold, wherein the key bit is a 1 if the sample value is greater than the upper threshold, wherein the key bit is a 0 if the sample is below the lower threshold, wherein the sample is invalid otherwise.

9. The system (200) of claim 8, wherein the threshold values vary depending on the sample index value corresponding to the sample point.

10. A system (200) for sending encrypted messages between a first vehicle and a second vehicle that are symmetrically affected by a stochastic process, wherein the stochastic process is observable to the first vehicle and the second vehicle and caused by road conditions and driving behavior, said system comprising:

a. the first vehicle (201) capable of transmitting a signal (210);
b. a first transceiver (202) disposed on the first vehicle (201);

c. a first sensor (203) disposed on the first vehicle (201), capable of sensing a signal (211) transmitted by the second vehicle (205);
d. a first processor (204) operatively connected to the first transceiver (202) and the first sensor (203);
e. the second vehicle (205) capable of transmitting a signal (211);
f. a second transceiver (206) disposed on the second vehicle;
g. a second sensor (207) disposed on the second vehicle, capable of sensing the signal (210) transmitted by the first vehicle (201); and
h. the second processor (208) operatively connected to the second transceiver (206) and the second sensor (207);
wherein the first processor (204) and the second processor (207) execute computer readable instructions that causes each processor to independently perform operations comprising:
  i. sending and receiving the signals with the processor of the other vehicle;
  ii. sampling a fixed number of sample points from the received signal at fixed intervals, thereby producing a plurality of sample points (212), each sample point having an index, wherein a same number of sample points is sampled by both vehicles, wherein the plurality of sample points is unique to the received signal due to the stochastic nature of the road conditions and driving behavior;
  iii. quantizing the plurality of sample points, wherein the quantized sample point is either a "1" or a "0", or invalid, wherein the quantized sample points that are "1" or "0" are valid, wherein the index values of the valid sample points are valid index values, wherein the valid quantized sample points comprise a plurality of key bits corresponding to the plurality of valid index values,
  iv. transmitting the plurality of valid index values to the other vehicle;
  v. receiving a plurality of valid index values from the other vehicle;
  vi. comparing the two pluralities of valid index values to determine a plurality of shared valid index values;
  vii. selecting the plurality of key bits corresponding to the plurality of shared valid index values, wherein the plurality of key bits thus selected comprises an encryption key;
  viii. encrypting a message using the encryption key;
  ix. transmitting the encrypted message to the other vehicle;
  x. receiving an encrypted message from the other vehicle; and
  xi. decrypting the encrypted message using the encryption key;
wherein the signals sent between the vehicles are symmetrically affected by road conditions and driving behavior in a manner observable to the vehicles, wherein the received signals are used to generate symmetric encryption keys, wherein instructions for quantizing the sample points are the same for both vehicles, wherein the encryption keys generated are identical, wherein as a result, the first vehicle is able to correctly decrypt the message from the second vehicle and the second vehicle is able to correctly decrypt the message from the first vehicle.

11. The system of claim 10, wherein the signals are visible light signals, wherein the stochastic process is a fluctuation in a signal strength of the visible light signals caused by road conditions and driving behavior.

12. The system of claim 11, wherein the visible light signals are generated by headlights or taillights of the vehicles.

13. The system (200) of claim 10, wherein the first and second sensors are photodetectors capable of detecting the light signals.

14. The system of claim 10, wherein the signals are radio frequency (RF) signals, wherein the stochastic process is a fluctuation of RF signal strength caused by road conditions and driving behavior.

15. The system (200) of claim 10, wherein the quantization rule comprises an upper and a lower threshold, wherein the key bit is a 1 if the sample value is greater than the upper threshold, wherein the key bit is a 0 if the sample is below the lower threshold, wherein the sample is invalid otherwise.

16. The system (200) of claim 15, wherein the threshold values vary depending on the sample index value corresponding to the sample point.

\* \* \* \* \*